Patented July 24, 1934

1,967,860

UNITED STATES PATENT OFFICE 1,967,860

POLYMERIZED HALOGENATED HYDROCARBON AND PROCESS OF PRODUCING THE SAME

Wallace H. Carothers, Arnold M. Collins, and James E. Kirby, Wilmington, Del., assignors to E. I. du Pont de Nemours & Company, Wilmington, Del., a corporation of Delaware No Drawing. Application February 28, 1931, Serial No. 519,242

28 Claims. (Cl. 260—6)

This invention relates to a method of preparing a new class of organic compounds. More particularly, it relates to an improvement in the process of polymerizing the addition products of monovinylacetylene and hydrochloric acid, which improvement comprises carrying out the polymerization in the presence of solvents adapted to facilitate control of the rate of reaction and the nature of the resulting polymers.

The addition product treated according to the present process and the preparation of the same is fully disclosed in an application of Carothers and Collins, Serial No. 490,538, filed October 22, 1930. It is chloro-2-butadiene-1,3 having the formula $CH_2=CCl-CH=CH_2$. The combination of monovinylacetylene with hydrogen chloride to form this product may be readily effected under a great variety of conditions.

Moreover, it has been disclosed by Carothers and Collins in their application, Serial No. 519,243, filed February 28, 1931, that by polymerizing chloro-2-butadiene-1,3 it is possible to obtain products having various degrees of solubility, plasticity, elasticity and strength. These polymer products have been obtained not only in the form of rubber-like masses but also in the form of readily volatile odorous liquids, viscous soft sticky masses and hard very tough granular masses. As clearly appears from that case, the nature of the product depends primarily upon the conditions under which polymerization is effected and the duration of the operation. Temperature, pressure, light and catalysts such as oxygen and the peroxides all affect the nature of the final product.

The polymerization of chloro-2-butadiene-1,3, however, is extremely sensitive to small variations in these conditions and it is sometimes difficult to control to obtain a polymer of the desired characteristics. In general, however, when the polymerization of pure chloro-2-butadiene-1,3 is allowed to progress under the ordinary conditions until all the chlorobutadiene has disappeared, the product is an exceedingly strong, elastic, rubber. This product is not dissolved but only swelled by the usual rubber solvents and it is not sufficiently plastic to be worked on the rolls of the rubber mill.

An object of the present invention, therefore, is to so control the polymerization of chloro-2-butadiene-1,3 as to obtain rubber-like products of improved plasticity and solubility. Another object is the production of mixtures of the chloro-2-butadiene-1,3 polymers containing, in addition to the polymer, inert solvents which are adapted to confer to the mixture the desired properties such as plasticity or reduced viscosity to the end that such products may be employed as coating compositions, cements and plastics. A further object is to produce solutions of chloro-2-butadiene-1,3 polymers which are adapted to be used as coating compositions, cements, and plastics.

With these objects in view it has been found that by polymerizing the chloro-2-butadiene-1,3 in the presence of solvents the polymerization may be more readily controlled to yield solutions of rubber-like polymers of chloro-2-butadiene-1,3. (The term "solvent" is here used in its broad sense to designate any material, not necessarily liquid, capable of dissolving chloro-2-butadiene-1,3 or capable of dissolving in chloro-2-butadiene-1,3.) Moreover, by employing a volatile solvent and allowing the solvent to evaporate or distill from such solutions at the proper stage of polymerization it is possible to isolate the rubber-like polymer as such in a plastic form capable of being fabricated or dissolved. The presence of a solvent in the polymerization of chloro-2-butadiene-1,3 may also produce other useful effects as more fully described below. Investigation has revealed that a very large number of solvents are adapted to be used in this connection.

The amount of solvent to be employed will of course vary within wide limits depending upon the result desired in the given instance and also depending upon the nature of the solvent employed. In general, amounts of solvent less than 5% of the total weight of solvent and chlorobutadiene do not produce any appreciable effect and on the other hand scarcely any additional advantage will ordinarily be gained by using amounts of solvent greater than 95% of the total.

The solvents suitable for use in this connection may be divided into several classes according to the effect produced as indicated below.

Thus, if the boiling point of an inert solvent is not above 200° C. and the solvent is adapted to dissolve not only the chloro-2-butadiene-1,3 but the resulting chloro-2-butadiene-1,3 polymer, it is possible to obtain homogeneous solutions of the polymers from which the solvent may be separated by evaporation or distillation.

In general, when solvents of the volatile type are employed, solutions containing over 50% polymer are stiff jellies; solutions containing even as little as 10% polymer, on the other hand, are quite viscous. The volatile diluent acts as a medium for the polymerization and tends to suppress the formation of non-plastic insoluble polymer. Unless the concentration of polymer in the resulting solution is greater than substantially 50%, the polymer which is obtained by the removal of the solvent from such solutions is plastic and capable of being redissolved. The resulting solution is adapted for use as a cement or binding agent or as an impregnating or coating composition since upon evaporation of the solvent the chloro-2-butadiene-1,3 polymer will remain as such. Solutions of this type are, moreover, readily mixed with dyes, fillers antioxidants, etc. Among the solvents of this class may be mentioned benzene, toluene, xylene, cymene, ethyl ether, carbon tetrachloride, turpentine, ethylene chloride, pyridine and carbon disulfide.

A second class of solvents is composed of liquids which are solvents for the polymer as well as for the chloro-2-butadiene-1,3 just as in the first case but which are non-volatile, i. e., their boiling point is above 200° C. The practical distinction between the solvents of this type and those first mentioned is that those of the first class can be readily and completely removed by evaporation and those of the second class cannot be so removed. The solvents in the second class of course will ordinarily remain with the polymer and permanently modify its properties. When present in sufficient amounts they function as softeners, plasticizers or lubricants and so modify the character of the polymer as to make it capable of being fabricated or mixed with other ingredients. Among such solvents may be mentioned spindle oil, machine oil, refined mineral oil, vaseline, diphenyl ether, ethyl benzoate, camphor, cotton-seed oil, linseed oil, corn oil, coconut oil, soya bean oil, cod-liver oil and tricresyl phosphate. In general such solvents do not have an appreciable softening or plasticizing effect when they are present in amounts less than 20% of the total. They then function chiefly as inert fillers. When present in larger amounts they soften and plasticize the product.

Another class of solvents adapted for use according to the process of this invention is composed of liquids which are solvents for the chloro-2-butadiene-1,3 and are themselves capable of being polymerized. Solutions formed with such solvents present the possibility of producing a mixture composed of the polymers of chloro-2-butadiene-1,3 together with the polymers of the solvent. Moreover, where the molecules of the solvent actually react with the molecules of chloro-2-butadiene-1,3 it is possible to form a polymeric compound chemically different from any product which might be obtained by an admixture of the individually formed polymers. This type of polymerization will hereafter be referred to as cross polymerization.

A fourth type of solvent includes liquids which are solvents for the chloro-2-butadiene-1,3 but are not solvents for the polymer. Thus, chloro-2-butadiene-1,3 is soluble in ethyl alcohol but the polymer is not. The latter therefore tends to separate from the alcohol as fast as it is formed. Polymers formed in this way are of lighter color and are more free from the odorous materials ordinarily present when the polymer is formed in the absence of such a diluent.

In carrying out the polymerization according to the method of the present invention the chloro-2-butadiene-1,3 is dissolved in the selected solvent and the solution then subjected to those conditions adapted to give the desired product. Thus, the solution may be permitted to stand at ordinary temperatures in the presence of air and in the absence of direct light, or if it is desired to accelerate the polymerization the solution may be heated or exposed to direct light or pressures above atmospheric. The reaction may be still further accelerated, as disclosed in the second of the above identified Carothers and Collins applications, by the presence of a peroxide.

In order to better disclose the invention in detail, the following examples are furnished. It should be understood, however, that these examples are presented merely as illustrations of the process and that the conditions and reagents therein specified may be widely varied.

The following examples illustrate the use of the first type of solvents discussed above, namely, those inert solvents the boiling point of which is below 200° C.

Example I

Equal parts of benzene and chloro-2-butadiene-1,3 are mixed and allowed to stand in a closed container in the presence of a little air at the ordinary conditions (summer temperature). After 16 days about 36% of the chlorobutadiene has polymerized and the mixture has set to a clear, soft, transparent jelly. When this jelly is spread out on a flat surface and freely exposed to the air, the benzene and the unchanged chlorobutadiene evaporate and leave a coherent film of rubber-like product. When fresh, this film dissolves completely in benzene, but after standing for one day it is no longer dissolved, but only swelled by benzene.

Such jellies as this may be diluted with benzene to yield less viscous solutions, or they may be concentrated by partial evaporation to yield stiffer jellies, and either before or after dilution or partial evaporation they may be mixed with antioxidants or other materials adapted to stabilize the product and to protect it from the action of the air.

The solutions may be used directly as cements, or as coating compositions, or impregnating agents. Thus if a piece of cloth is soaked in such a solution and then allowed to drain and dry, it is coated with a film of strongly adhering rubber-like polymer.

Example II

Such solutions may also be used as a source of rubber-like polymer which is at once elastic, plastic and soluble and capable of being fabricated or redispersed in organic solvents, to give solutions of rubber-like polymer free of unchanged chloro-2-butadiene-1,3.

Thus a sample of chloro-2-butadiene-1,3 is mixed with twice its volume of benzene and the solution is allowed to stand in a closed container for about five weeks until about 25% of the chlorobutadiene has polymerized. The resulting soft transparent jelly is mixed with 0.5% of its weight of phenyl-alpha-naphthylamine and the benzene and unchanged chloro-2-butadiene-1,3 are removed by distillation. The residue is rubber-like, plastic, quite elastic and completely soluble in benzene. It may be rolled out into a sheet and then allowed to stand when it shows only a very slight tendency to contract. After 3 days the plasticity is lost and the material no longer dissolves in benzene. It slowly hardens to a tough, elastic mass.

Example III

In general, as will appear from the preceding example, the polymers when freshly obtained by evaporation of the solvent are plastic, elastic and soluble in benzene and other rubber solvents, but this is not true of a sample polymerized in benzene solution under very high pressure.

For example, a mixture of 33 parts of chloro-2-butadiene-1,3 and 67 parts of benzene is allowed to stand for 20 days in a stoppered bottle, and the resulting colorless, viscous liquid which still contains a considerable amount of unchanged chloro-2-butadiene-1,3 is heated to 61° C. for 18.5 hours while it is subjected to a pressure of 2000 atmospheres. The product containing benzene is a strong, elastic, plastic gel. On standing, the benzene evaporates from it. The residue is very elastic and still somewhat plastic, but it merely swells and does not dissolve in benzene.

Example IV

A sample of chloro-2-butadiene-1,3 is dissolved in four times its volume of benzene, and placed in a Pyrex glass vessel containing a little air. The mixture is cooled to 10° C. and at this temperature it is strongly illuminated by a mercury arc (in quartz). After 22 hours the solution has become considerably more viscous and it then contains about 13% of the polymer resembling unvulcanized rubber.

If a quartz container is used for the solution a somewhat larger amount of polymer is formed in 22 hours.

Example V

The polymerization of chloro-2-butadiene-1,3 in solution is accelerated by heating. Chloro-2-butadiene-1,3 is mixed with an equal volume of xylene and the solution is heated to 100° for 4 hours. This results in the conversion of about 18% of the chloro-2-butadiene-1,3 into polymer, which remains in solution.

Example VI

It is also accelerated by catalysts. Chloro-2-butadiene-1,3 containing 1% of its weight of benzoyl peroxide is mixed with an equal volume of xylene and heated to 100° C. for 36 minutes. This results in the conversion of about 70% of the chloro-2-butadiene-1,3 into polymer which remains in solution.

Example VII

Concentrated solutions polymerize more rapidly and completely than dilute ones. Chloro-2-butadiene-1,3 in the presence of benzoyl peroxide as in the previous example, but mixed with three times its volume of xylene, is 72% polymerized in three hours.

In a fashion similar to that illustrated in the above examples, chloro-2-butadiene-1,3 may be dissolved in carbon tetrachloride, toluene, cymene, ethylene chloride, ether, pyridine, or other solvents and allowed to polymerize. In ethereal or pyridine solution it polymerizes more slowly than in benzene.

The following examples illustrate the use of solvents of the second type described above, namely, those solvents which are inert and are adapted to dissolve not only the chloro-2-butadiene-1,3 but the resulting polymer, and, in addition, have a boiling point above 200° C. When present in sufficient amount these solvents function as plasticizers or lubricants.

Example VIII

A sample of chloro-2-butadiene-1,3 containing 20% of its weight of vaseline is allowed to stand at the ordinary conditions in the presence of a little air. After one month 94% of the chlorobutadiene has polymerized. The product is a very strong, tough, elastic mass resembling vulcanized rubber. It is not plastic and it does not dissolve in benzene. In these respects the product resembles the polymer formed under the same conditions in the absence of the vaseline.

Example IX

A sample of chloro-2-butadiene-1,3 containing 20% of its weight of cottonseed oil is allowed to stand at the ordinary conditions in the presence of a little air. After three weeks 96% of the chlorobutadiene has polymerized. The product resembles that of the previous example.

Example X 50 parts of chloro-2-butadiene-1,3 and 50 parts of refined cottonseed oil are placed in a stoppered bottle. After 9 days the mixture has set to a colorless, transparent, elastic, plastic mass. It contains very little volatile material but is completely soluble in benzene. (After it has stood for several days, some of the oil is squeezed out and the plasticity is lost.)

A similar material is obtained in 6 days by heating the above mixture of chloro-2-butadiene-1,3 and cottonseed oil to 62° C.

Example XI

A similar material is obtained in 46 hours by heating the chloro-2-butadiene-1,3 and cottonseed oil to 45° C. under a pressure of 2000 atmospheres.

Example XII

Fifty parts of chloro-2-butadiene-1,3 and 50 parts of linseed oil are placed in a stoppered bottle and allowed to stand for 3 weeks. The product is a transparent, elastic, plastic mass. It contains very little volatile material, but is completely soluble in benzene.

Example XIII

One part of chloro-2-butadiene-1,3 and two parts of coconut oil as above in 11 days gives a plastic elastic mass soluble in benzene.

Example XIV

One part of chloro-2-butadiene-1,3 and one part of corn oil as above in six days gives a plastic mass which is completely soluble in benzene.

Example XV

Chloro-2-butadiene-1,3 is mixed with about one-third of its weight of powdered shellac. The shellac imbibes chlorobutadiene and swells to yield an apparently homogeneous mixture. After one month all the chlorobutadiene has polymerized. The product is a strong elastic mass much harder than the ordinary rubber-like polymer. It is insoluble in benzene or alcohol.

Example XVI

A solution of 30 parts of stearic acid in 70 parts of chloro-2-butadiene-1,3 is allowed to stand at the ordinary conditions in the presence of a little air. During the course of the polymerization the stearic acid gradually crystallizes out. After a month 50% of the chlorobutadiene has polymerized. The product obtained by allowing the unchanged chlorobutadiene to evaporate is very soft and plastic. It is also completely soluble in benzene.

Mixtures made from the non-volatile solvents as described in the preceding group of examples may contain the solvent in varying quantities.

When a small amount of solvent is present, e. g., up to 20%, such solvents in general have no appreciable effect on the properties of the polymer and in such cases they function merely as diluents. When larger amounts of such materials are used, however, they not only act as diluents, but also materially affect the properties of the polymer as fully illustrated in the above examples. As illustrated in Example X the strong plastic jellies consisting of mixtures of chlorobutadiene polymer and non-volatile solvent sometimes undergo syneresis on standing.

The polymerization of chloro-2-butadiene-1,3 in the presence of solvents which are themselves capable of being polymerized is illustrated by the following examples:

Example XVII

One volume of chloro-2-butadiene-1,3 and one volume of isoprene are mixed and sealed in a vessel containing two volumes of air. The mixture is allowed to stand for three months, and is then opened. The product is a colorless, transparent, strong, very extensible, elastic mass. It still contains some unchanged isoprene which gradually evaporates when the sample is freely exposed to the air.

Example XVIII

One volume of chloro-2-butadiene-1,3 and one volume of styrene are mixed and treated as above. The product is a colorless transparent, strong, very extensible, elastic mass. It still contains some unchanged styrene which gradually evaporates when the sample is freely exposed to the air.

Example XIX

A sample of chloro-2-butadiene-1,3 containing 20% of its weight of China wood oil is allowed to stand at the ordinary conditions in the presence of a little air. After three weeks 60% of the chlorobutadiene has polymerized. The product is a soft and rather plastic mass but it does not completely dissolve in benzene.

In addition to the embodiments disclosed in the above three examples, chloro-2-butadiene-1,3 has been polymerized in the presence of such polymerizable substances as indene, vinylacetylene, vinyl acetate and divinyl acetylene to obtain products having properties somewhat similar to those described in the examples. The exact chemical structure of the resulting products is uncertain.

The polymerization of chloro-2-butadiene-1,3 in the presence of the fourth type of solvents in which the resulting polymers are insoluble and from which they are precipitated is illustrated by the following examples:

Example XX

One volume of chloro-2-butadiene-1,3 is dissolved in two volumes of petroleum ether and the resulting solution is allowed to stand at the ordinary conditions in the presence of a little air. A precipitate of the chlorobutadiene polymer gradually accumulates on the walls and bottom of the container. This polymer is plastic and soluble in benzene.

Example XXI

One volume of chloro-2-butadiene-1,3 and four volumes of 80% ethyl alcohol are placed in a glass vessel and exposed at 20° C. to the light from a mercury arc. A precipitate of chlorobutadiene polymer gradually accumulates on the wall of the container and settles to the bottom of the vessel. After 72 hours practically all the chlorobutadiene has polymerized. The product is an opaque, white solid, very strong and elastic. It is almost completely free of odor.

It may be said that in general the polymerization of chloro-2-butadiene-1,3 in solvents of the various types illustrated above proceeds more slowly than in the absence of solvents and it is apparent that the particular solvent itself has a specific affect on the velocity of polymerization. Thus, polymerization is much slower in pyridine and ethyl ether than in benzene or ethylene chloride.

The rate of polymerization of course is greatly affected, as already disclosed in previous applications, by temperature, light, pressure and catalysts. The degree of heating may be varied over a wide range and it is interesting to note that much higher temperatures may be used for polymerization when a solvent or diluent is present than otherwise without danger of producing a discolored product or a product lacking in transparency.

The present invention contemplates the use of solvents in combination with any of the conditions disclosed in the previously filed Carothers and Collins applications. Thus, the chloro-2-butadiene-1,3 solution may be maintained or polymerized in the presence or absence of air or below or above ordinary temperature and pressure and in the presence of or absence of direct light and these conditions have in general the same affect upon the rate of polymerization of the dissolved chloro-2-butadiene-1,3 and the properties of the final product that they have in the absence of an added solvent. Unless otherwise stated, the polymerization in the above examples has been carried out in the absence of direct light. Air was present in all the examples.

Furthermore, as is disclosed in the prior Carothers and Collins cases, polymerization catalysts such as the peroxides may or may not be used as desired. Also, as will appear from the examples (see Example II), polymerization inhibitors or antioxidants as disclosed in Carothers, Collins and Kirby Case 1, Serial No. 519,241 filed February 28, 1931 may or may not be present during the polymerization of the solution. Among the preferred inhibitors and antioxidants disclosed in the above identified application may be mentioned catechol, pyrogallol, trinitrobenzene, m-toluylene diamine, phenyl-alpha-naphthyl-amine and thiodiphenyl amine. Although the presence of such inhibitors greatly increases the time required for polymerization, their use is often desirable for the purpose of facilitating the control of the polymerization to obtain products having certain well defined characteristics. Such inhibitors may of course be added subsequent to or at any stage of the polymerization for the purpose of preserving the product.

The usual compounding ingredients and inert fillers commonly employed in the rubber art similarly may be incorporated either prior to, during, or subsequent to polymerization.

The solutions of polymerized chloro-2-butadiene-1,3 as prepared according to the present invention are adapted for various uses. Plastic products obtained by evaporation of the volatile solvents, as already disclosed, may be worked on the rolls of a rubber mill, fabricated and allowed to cure in the form desired to produce tough, elastic rubber-like articles.

Dilute solutions in a volatile or film-forming solvent, readily wet cloth or glass, for example, and thus are adapted for use as impregnating agents or cements. Since when spread in a thin film they harden to form a tough, elastic, tightly adhering coating, such solutions are admirably adapted for use as coating compositions. The following examples will illustrate the preparation of such compositions.

*Example XXII*

One hundred twenty grams of a 50% solution of chloro-2-butadiene-1.3 polymers similar to the solution obtained in Example 1 but containing toluene instead of benzene is dissolved in 317 grams of toluene, mixed with 67.5 grams of Titanox and 0.6 grams of phenylbetanaphthylamine and ground for 24 hours in a pebble mill with quartz pebbles. The resulting white base is thinned with toluene to a viscosity suitable for application by spraying, brushing, dipping, etc. A film of this paint dries in 1½ hours to a tough, elastic coating.

*Example XXIII*

Two hundred twenty grams of a 27% solution of chloro-2-butadiene-1.3 polymer in toluene similar to that used in the above example is ground for 24 hours in a ball mill with steel balls together with 9.4 grams of carbon black and 0.8 gram of phenylbetanaphthylamine. The resulting paste is thinned with xylene to a viscosity suitable for application. A film of this composition dries in 16 hours to a tough, elastic black coating.

The use of solutions of chloro-2-butadiene-1,3 polymers for coating compositions is of course not limited to the above examples. Thus any of the common pigments such as lithopone, zinc oxide, white lead, chrome orange, iron oxide, Prussian blue, or red lakes or fillers such as whiting, asbestine, silica, and the like may be used and their ratio to the chloro-2-butadiene-1,3 polymer may be varied greatly according to the type of composition desired. In addition to toluene and xylene mentioned in these examples, any of the volatile solvents for chloro-2-butadiene-1,3 polymers mentioned above may be used as solvents or thinners. Phenylbetanaphthylamine, which is added to inhibit the atmospheric oxidation of the chloro-2-butadiene-1,3 polymers, may be replaced by any of the non-volatile antioxidants commonly used for the protection of rubber. In some cases it is desirable to add acid acceptors such as zinc oxide or sodium oleate to combine with the hydrogen chloride which is liberated in small quantities under certain conditions during the aging of the chloro-2-butadiene-1,3 polymers. Instead of the solutions of chloro-2-butadiene-1,3 polymer used in the above examples, we may use solutions in volatile solvents of any of the chloro-2-butadiene-1,3 products described above such as chloro-2-butadiene-1,3 polymerized in the presence of solvents other than toluene, chloro-2-butadiene-1,3 polymerized in the presence of non-volatile solvents for the chloro-2-butadiene-1,3 polymers, or chloro-2-butadiene-1,3 polymerized in the presence of other polymerizable materials. Furthermore, other film-forming or polymerizable materials such as China wood oil may be mixed with the chloro-2-butadiene-1,3 polymers after their formation. Other variations in the compositions of these coating compositions and in the method of their manufacture and application will be obvious to one familiar with the art and are included in the scope of this invention.

These compositions upon hardening form tough, waterproof coatings resistant to abrasion, to the action of certain solvents such as gasoline, and to chemical action in general. They may be applied by brush, spray or dipping to paper, fabrics, wood, metal, leather, rubber, linoleum, brick, stone, etc.

As many apparent and widely different embodiments of this invention may be made without departing from the spirit thereof, it is to be understood that we do not limit ourselves to the foregoing examples or descriptions except as indicated in the following claims.

We claim:

1. The process of forming a new product which comprises polymerizing chloro-2-butadiene-1,3 in the presence of an added solvent for the chloro-2-butadiene-1,3.

2. The process of claim 1 wherein the solvent is an inert liquid.

3. The process of claim 1 wherein the solvent is an inert liquid boiling at or below 200° C.

4. The process of claim 1, wherein the solvent is an inert liquid boiling above 200° C.

5. The process of claim 1 wherein the solvent for the chloro-2-butadiene-1,3 is also a solvent for the resulting polymer.

6. The process of claim 1 wherein the polymerization is carried out at temperatures above normal.

7. The process of claim 1 wherein the polymerization is carried out in the presence of air.

8. The process of claim 1 wherein the polymerization is carried out under pressures above atmospheric.

9. The process of claim 1 wherein the polymerization is carried out in the presence of direct light.

10. The process of claim 1 wherein a peroxide is used as a catalyst for the polymerization.

11. The process of claim 1 wherein the solvent for the chloro-2-butadiene-1,3 is not a solvent for the resulting chloro-2-butadiene-1,3 polymer and the latter is precipitated as formed.

12. The process which comprises subjecting a solution of chloro-2-butadiene-1,3 in an inert solvent boiling at or below 200° C. to conditions adapted to effect polymerization of the chloro-2-butadiene-1,3 and thereafter removing the solvent.

13. The process of claim 12 wherein the solvent is separated before the polymer concentration in the solution reaches 50%.

14. A polymer of chloro-2-butadiene-1,3 obtained by the process of claim 12.

15. A plastic polymer of chloro-2-butadiene-1,3 obtained by dissolving chloro-2-butadiene-1,3 in an inert volatile solvent, polymerizing the chloro-2-butadiene-1,3 and separating the volatile solvent from the polymer before the polymer concentration reaches 50%.

16. A solution of a polymer of chloro-2-butadiene-1,3 produced according to the process of claim 1 in an inert non-volatile oil, said mixture being elastic, plastic, and completely soluble in the usual rubber solvents.

17. A solution of a polymer of chloro-2-butadiene-1,3 produced according to the process of claim 1 in an inert, non-volatile oil, said solution being elastic, non-plastic and insoluble in benzene.

18. A tough, elastic, opaque, white solid obtained by exposing a solution of chloro-2-butadiene-1,3 in alcohol to the action of direct light until polymerization is substantially complete.

19. A composition comprising a solution of a chloro-2-butadiene-1,3 polymer produced according to the process of claim 1 and a pigment.

20. A liquid composition produced according to the process of claim 1 comprising a polymer of chloro-2-butadiene-1,3 and a volatile solvent.

21. The process of forming a new product which comprises polymerizing halogen-2-butadiene-1,3 in the presence of an added solvent for the halogen-2-butadiene-1,3.

22. The process of claim 21 wherein the solvent is an inert liquid boiling at or below 200° C.

23. The process of claim 21 wherein the solvent is an inert liquid boiling above 200° C.

24. The process of claim 21 wherein the solvent for the halogen-2-butadiene-1,3 is also the solvent for the resulting polymer.

25. A product produced according to the process of claim 1.

26. A product produced according to the process of claim 1 in which the added solvent is inert.

27. A liquid coating composition comprising a product of claim 1, a volatile solvent and a pigment.

28. A product produced according to the process of claim 21.

WALLACE H. CAROTHERS.
ARNOLD M. COLLINS.
JAMES E. KIRBY.